US007639121B2

(12) United States Patent
Kim

(10) Patent No.: US 7,639,121 B2
(45) Date of Patent: Dec. 29, 2009

(54) APPARATUS AND METHOD FOR INITIALIZING A TELEMATICS TERMINAL

(75) Inventor: Young-Mun Kim, Gunpo (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 11/275,440

(22) Filed: Jan. 3, 2006

(65) Prior Publication Data

US 2006/0158319 A1 Jul. 20, 2006

(30) Foreign Application Priority Data

Jan. 5, 2005 (KR) ...................... 10-2005-0000892

(51) Int. Cl.
*B60Q 1/00* (2006.01)

(52) U.S. Cl. .............. 340/425.5; 340/545.1; 340/995.1; 713/1; 713/100; 381/104; 381/302

(58) Field of Classification Search .............. 340/425.5, 340/545.1, 995.1; 713/1, 100; 381/104, 381/302
See application file for complete search history.

(56) References Cited

U.S. PATENT DOCUMENTS

| | | | | |
|---|---|---|---|---|
| 5,959,545 | A | 9/1999 | Lhamon | |
| 6,871,067 | B2 * | 3/2005 | Clark et al. | 455/428 |
| 2003/0050023 | A1 | 3/2003 | Benz | |
| 2003/0181169 | A1 * | 9/2003 | Mutoh | 455/99 |
| 2005/0100174 | A1 * | 5/2005 | Howard et al. | 381/86 |
| 2006/0038674 | A1 * | 2/2006 | Sumcad et al. | 340/539.18 |
| 2006/0122748 | A1 * | 6/2006 | Nou | 701/29 |

OTHER PUBLICATIONS

International Application No. EP 06 29 0004 Search and Examination Report dated Apr. 5, 2006 (6 pages).

* cited by examiner

*Primary Examiner*—Benjamin C Lee
*Assistant Examiner*—Son M Tang
(74) *Attorney, Agent, or Firm*—Fish & Richardson P.C.

(57) ABSTRACT

A method and apparatus for initializing a telematics terminal includes generating a door open signal corresponding to an open state of a door of a vehicle. The telematics terminal is initialized based on the door open signal. An accessory signal corresponding to a position or change in operating state of an ignition switch may be generated. At least one telematics module within the vehicle can be initialized based on the door open signal or the accessory signal.

15 Claims, 3 Drawing Sheets

APPARATUS AND METHOD FOR INITIALIZING A TELEMATICS TERMINAL

CROSS-REFERENCE TO RELATED APPLICATIONS

This application claims priority under 35 U.S.C. § 119 to Korean Patent Application No. 00892/2005, filed in Korea on Jan. 5, 2005, the entirety of which is incorporated by reference herein.

BACKGROUND

This description relates to initialization of a telematics terminal in a vehicle.

In general, a telematics terminal is mounted in a car (or other mobile vehicle) and connected with a wireless communication network. The telematics terminal provides a call function, map information, a multimedia function, and/or a GPS (Global Positioning System) navigation function, and also includes an audio/video system.

A telematics terminal will be described hereinafter with reference to FIGS. 1 and 2. FIG. 1 shows a conventional telematics terminal 100 mounted in a car, and FIG. 2 is a schematic block diagram showing a conventional telematics system.

Referring to FIG. 2, the telematics system includes an information providing center 300 for providing telematics service information such as a call function, map information, traffic information and/or multimedia information, and a telematics terminal 100 for receiving the telematics service information through a wireless communication network 200 and providing the received telematics service information to users.

The telematics terminal 100 is initialized based on an ACC (Accessory) signal generated when a driver turns on an ignition key. Thus, when the driver enters a vehicle, the telematics terminal is inoperable during the initialization time of the telematics terminal 100.

SUMMARY

In one general aspect, a method for initializing a telematics terminal includes generating a door open signal corresponding to an open state of a door of a vehicle. The method includes initializing a telematics terminal based on the door open signal.

Implementations may include one or more of the following features.

Initializing the telematics terminal may include initializing a multimedia player within the telematics terminal based on the door open signal. Initializing of the telematics terminal may include initializing a telematics module within the telematics terminal based on the door open signal.

The door open signal may be a door unlock signal for opening the door of the vehicle. The door open signal may be generated responsive to a position or change in position of the vehicle door.

Generating the door open signal may include detecting an opened state of a driver's side door of the vehicle. An accessory signal may be generated that corresponds to a position or change in operating state of an ignition switch. The telematics terminal may be based on the accessory signal.

The door unlock signal may be transmitted with a remote controller. The door unlock signal may be generated at the door of the vehicle.

In another general aspect, a method for initializing a telematics terminal includes generating a door open signal corresponding to an open state of a door of a vehicle. The method includes initializing a multimedia device based on the door open signal.

Implementations may include one or more of the following features.

Initializing the multimedia device may include monitoring the multimedia device for available storage media. Initializing the multimedia device may include loading the multimedia device with the available storage media or contents of the available storage media.

The method may include generating an accessory signal corresponding to a position or change in operating state of an ignition switch. The method may include initializing the multimedia device based on the accessory signal.

In another general aspect, a method for controlling a vehicle system includes generating a door open signal corresponding to an open state of a door of a vehicle. The method includes generating an accessory signal corresponding to a position or change in operating state of an ignition switch. At least one telematics module within the vehicle is initialized based on the door open signal or the accessory signal.

Implementations may include one or more of the following features.

The door open signal may be generated responsive to a position or change in position of the vehicle door. The door open signal may be a door unlock signal for opening the door of the vehicle.

In another general aspect, an apparatus for initializing a telematics terminal includes a door detecting unit configured for generating a door open signal corresponding to an open state of a door of a vehicle. The apparatus includes a controller configured for initializing at least one telematics module in the vehicle based on the door open signal.

Implementations may include one or more of the following features.

The controller may be configured for initializing at least one telematics module inside the vehicle based on an accessory signal corresponding to a position or change in operating state of an ignition switch.

The apparatus may include an interface circuit electrically connected between the door detecting unit and the controller, wherein the interface circuit is configured for receiving the accessory signal and the door open signal.

The door open signal may be generated responsive to a position or change in position of the vehicle door. The door open signal may be a door unlock signal for opening the door of the vehicle.

The foregoing and other objects, features, aspects and advantages will become more apparent from the following detailed description when taken in conjunction with the accompanying drawings.

DETAILED DESCRIPTION

An apparatus and method for initializing a telematics terminal and a multimedia player and for quickly initializing the telematics terminal and the multimedia player when a door of a vehicle is opened will be described in greater detail hereinafter with reference to FIGS. 3 to 5.

Figure 1:
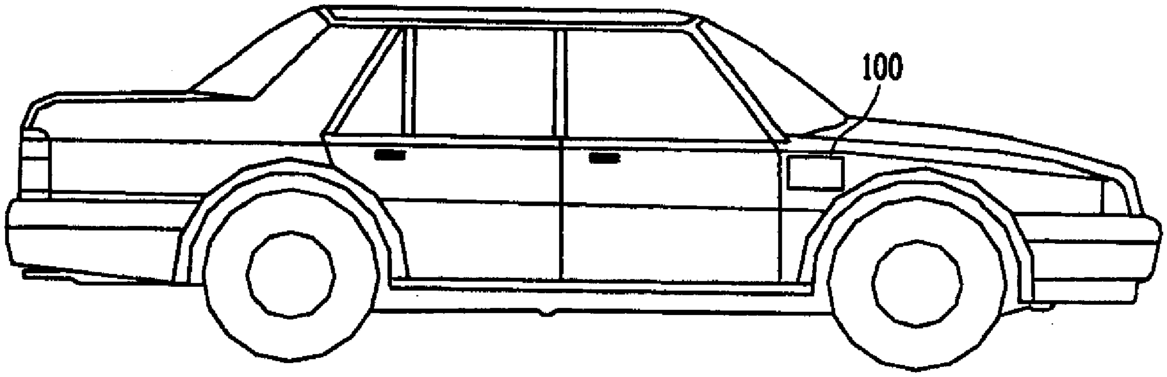
FIG. 1 CONVENTIONAL ART
FIG. 1 is a view of a telematics terminal mounted in a vehicle.
Figure 2:
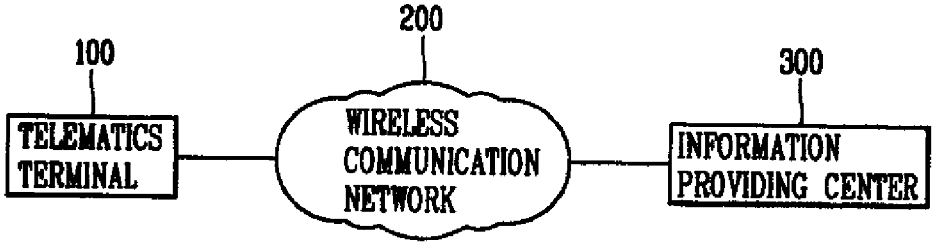
FIG. 2 CONVENTIONAL ART
FIG. 2 is a schematic block diagram of a conventional telematics system.
Figure 3:
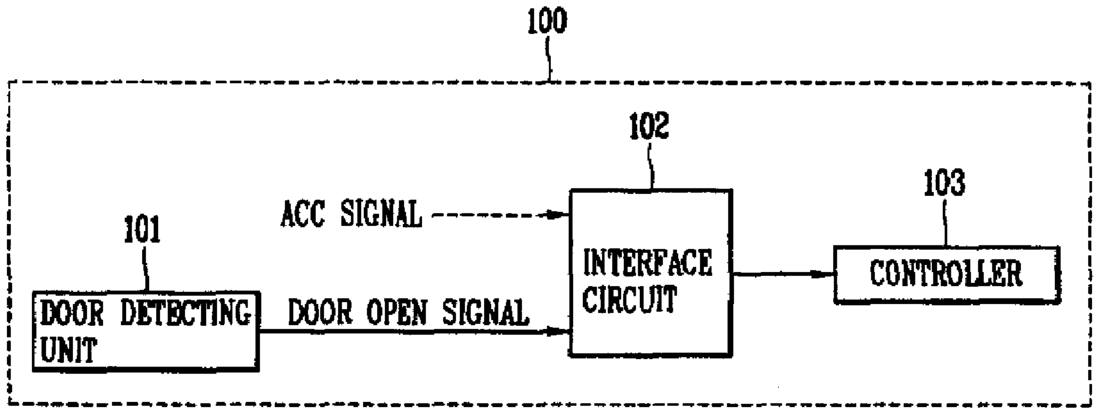
FIG. 3 is a schematic block diagram of an apparatus for initializing a telematics terminal in a vehicle.

FIG. 3 is a schematic block diagram of an apparatus for initializing a telematics terminal in a vehicle in accordance with a first embodiment. As shown in FIG. 3, an apparatus for initializing a telematics terminal 100 in a vehicle includes a door detecting unit 101 for generating a door open signal based upon a door's open state, e.g., when a door of a vehicle is opened or closed, when a control signal to open a door is transmitted to or received by the door detecting unit 101, when other changes occur in a door's position, such as partially opened/closed beyond a threshold, locked, unlocked or other state or position changes experienced by the door. The telematics terminal 100 also includes a controller 103 for initializing the telematics terminal 100 in the vehicle based on the door open signal. Initializing may include one or more of powering up the telematics terminal, switching the telematics to a standby or active mode and/or loading an operating system or content from an available storage media into or with one or more modules of the telematics terminal.

The controller 103 receives the door open signal through an interface circuit 102 electrically connected between the controller 103 and the door detecting unit 101 and initializes the telematics terminal 100 based on the door open signal.

An operation mode of the controller 103 is set to a door detection mode by a user, or upon installation or configuration of the controller. The controller 103 initializes the telematics terminal 100 based on the door open signal when in the door detection mode. Alternatively, or in combination with the door detection mode, the operation mode of the controller 103 can be set to an ACC (Accessory signal) mode by the user or upon installation or configuration of the controller. In the ACC mode, the controller 103 initializes the telematics terminal 100 based on the ACC signal generated when an ignition key of the vehicle is manually turned to an on or off position or is activated with a remote controller, e.g., to change an operating state of an ignition switch.

The operation of the apparatus for initializing the telematics terminal 100 in the vehicle in accordance with an exemplary embodiment will be described in greater detail hereinafter with reference to FIG. 3.

First, when the operation mode of the controller 103 is set to the ACC mode, such as by the user, the controller 103 receives the ACC signal generated when the ignition key is turned to control an ignition switch as a driver enters the vehicle. The controller 103 receives the ACC signal through the interface circuit 102 and initializes the telematics terminal 100 based on the received ACC signal.

When the operation mode of the controller 103 is changed to the door detection mode, such as by the user, the door detecting unit 101 detects an open state of the door, such as the door adjacent to a driver's seat as a driver opens the door to enter the vehicle. The door detecting unit 101 also outputs a generated door open signal to the interface circuit 102. However, the door detecting unit 101 can output the door open signal directly to the controller 103, e.g., not via the interface circuit 102. The door detecting unit 101 includes one or more switches to generate the door open signal.

The controller 103 receives the door open signal and initializes the telematics terminal 100 based on the received door open signal. In addition, when one, e.g., the door open signal, of the ACC signal and the door open signal is received, the controller 103 can disregard the other signal, e.g., the ACC signal that is received later. The controller 103 can alternatively disregard either of the signals based on a predetermined order of significance, e.g., wherein the ACC signal is treated as a secondary signal with respect to the door open signal or vice versa.

Accordingly, in the apparatus for initializing the telematics terminal 100 in the vehicle in accordance with the first embodiment, by initializing the telematics terminal 100 based on the door open signal instead of the ACC signal, the telematics terminal can be initialized quickly. For example, while the driver is in the process of opening the door of the vehicle, sitting on the driver's seat and turning on the ignition key of the vehicle, the telematics terminal can be initialized so that the driver can promptly use the telematics terminal.

The apparatus for initializing the telematics terminal 100 in the vehicle can quickly initialize various modules installed in the telematics terminal or only a specific one of the various modules based on the door open signal. For example, a multimedia player of the telematics terminal can be quickly initialized based on the door open signal.

The method for initializing the multimedia player of the telematics terminal will now be described with reference to FIG. 4. FIG. 4 is a schematic block diagram of an apparatus 200 for initializing a multimedia player of a telematics terminal in a vehicle in accordance with a second embodiment. The multimedia player can be an optical disk or other media player, such as a CD (Compact Disk) player and/or a DVD (Digital Video Disk or Digital Versatile Disk) player 204.

Figure 4:
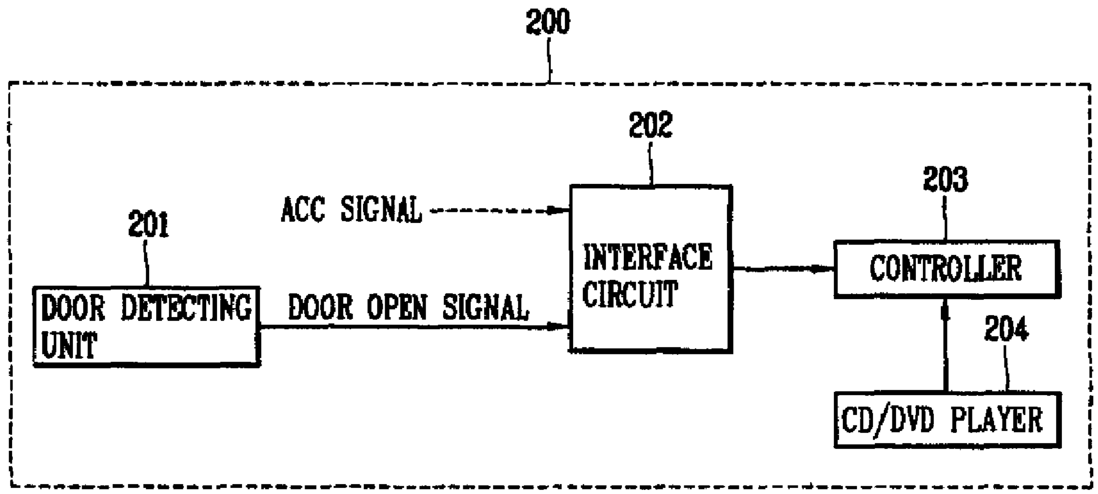
FIG. 4 is a schematic block diagram of an apparatus for initializing a multimedia player of a telematics terminal in a vehicle.
Figure 5:
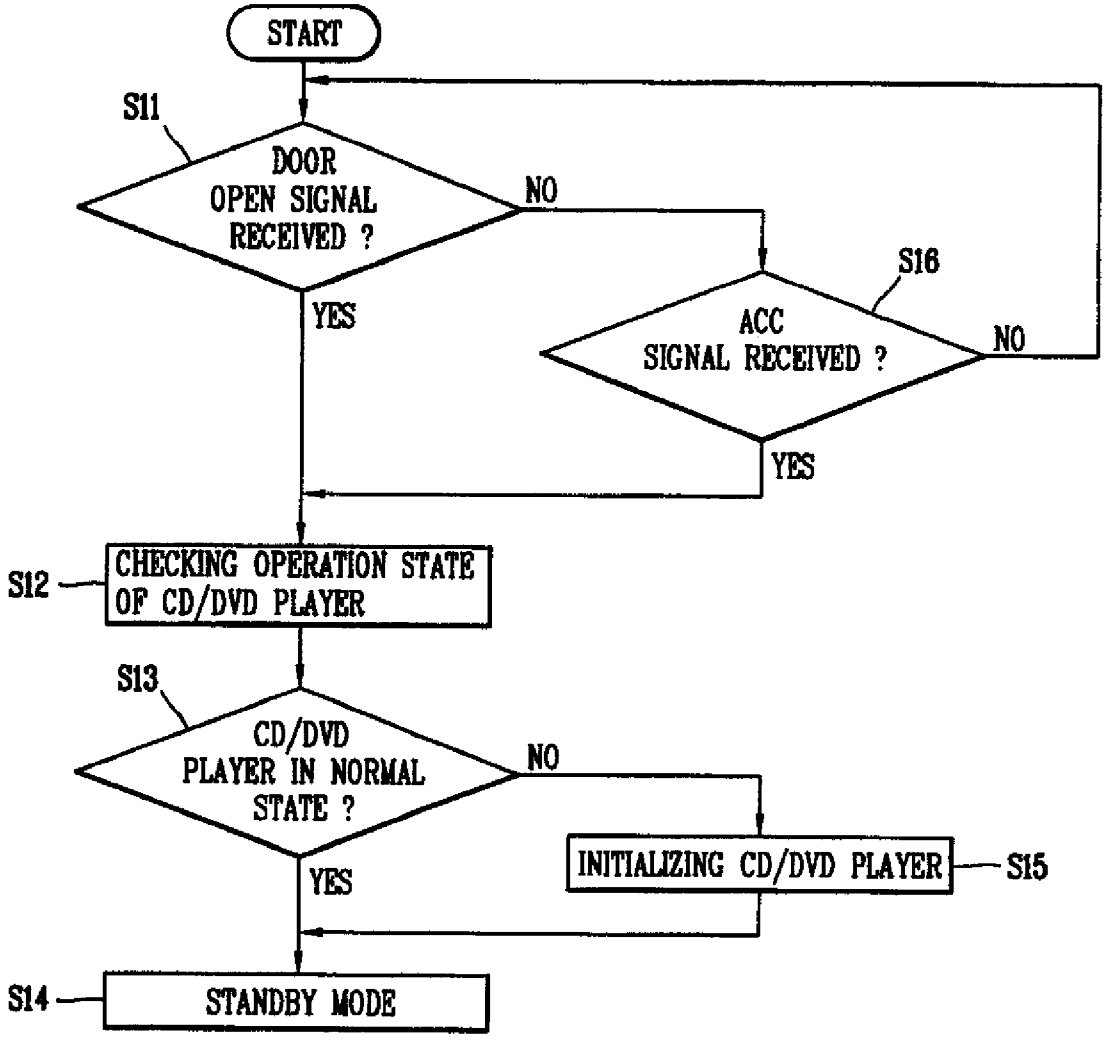
FIG. 5 is a flow chart of an initialization operation of the multimedia player of the telematics terminal of FIG. 3.

Referring to FIG. 4, the apparatus 200 for initializing the multimedia player, e.g., the CD/DVD player, includes a door detecting unit 201 for generating a door open signal when the door, e.g., a door adjacent to or immediately next to a driver's seat, of the vehicle is opened. The apparatus 200 includes an interface circuit 202 for receiving an ACC signal generated when an ignition key of the vehicle is turned on or the door open signal, and a controller 203 for determining an operation state of the CD/DVD player 204 based on the door open signal or the ACC signal. The controller also 203 initializes the CD/DVD player 204 when the CD/DVD player 204 is in an abnormal state or powered-down state.

The operation of the apparatus for initializing the CD/DVD player in accordance with the second embodiment will be described in greater detail with reference to FIGS. 4 and 5. FIG. 5 is a flow chart of an initialization operation of the multimedia player of the telematics terminal 100 in accordance with the second embodiment. First, when the driver opens the door of the driver's seat to enter the vehicle, the door detecting unit 201 detects the opened state of the door of the driver's seat, generates the door open signal, and outputs it to the interface circuit 202. Alternatively, the door detecting unit 201 outputs the door open signal directly to the controller 203, e.g., not via the interface circuit 202, and/or senses only the opened state of the door of the driver's seat of the vehicle.

The controller 203 receives the door open signal (step S11) and initializes the CD/DVD player 204 based on the received door open signal. For example, the controller 203 determines whether a CD or a DVD has been inserted in the CD/DVD player 204 based on the door open signal, and if the disk is not completely loaded, the controller 203 completes disk loading. The controller 204 checks an operation state of the CD/DVD player 204 (step S12), and if the CD/DVD player 204 is in an abnormal state (step S13) or powered-down state, the controller 204 initializes the CD/DVD player 204 to restore the CD/DVD player 204 to its normal operating state (step S15).

After initializing the CD/DVD player 204, the controller 203 changes the operation mode of the CD/DVD player 204 to a standby mode (step S14). When the CD/DVD player 204 is in a normal state (step S13), the controller 203 changes the operation mode of the CD/DVD player 204 to the standby mode in order to receive an input of a user. When the controller 203 is changed to the ACC mode by the user, the controller 203 receives the ACC signal generated when the driver enters the vehicle and activates the ignition switch, such as turning the ignition key. The ACC signal is sent to the controller 203 through the interface circuit 202, and the controller initializes the CD/DVD player 204 based on the received ACC signal. For example, the controller 203 determines whether the CD or the DVD has been inserted in the CD/DVD player 204 responsive to the ACC signal, and if disk loading is not completed, the controller 203 completes disk loading. The controller 204 checks an operation state of the CD/DVD player 204, and if the CD/DVD player 204 is in an abnormal state, the controller 204 initializes the CD/DVD player 204 to restore the CD/DVD player 204 to its normal state. The controller 203 can initialize the CD/DVD player 204 and then changes the operation mode of the CD/DVD player 204 to a standby mode. When the CD/DVD player 204 is in the abnormal state, the controller 203 changes the CD/DVD player 204 to the standby mode in order to receive an input of the user. When one, e.g., the door open signal, of the ACC signal and the door open signal is first received, the other signal received later, e.g., the ACC signal, is disregarded in order not to repeat the initialization operation of the CD/DVD player 204.

Accordingly, the CD/DVD player 204 is initialized based on the door open signal in the second embodiment, so that the CD/DVD player 204 can be initialized quickly. For example, while the driver is in the process of opening the door of the vehicle, sitting on the driver's seat and turning on the ignition key of the vehicle, the CD/DVD player 204 can be initialized, so that the driver can promptly use the CD/DVD player 204.

The initialization apparatus in accordance with the foregoing embodiments can be applied to various devices installed in the vehicle in various ways. For example, when a car owner generates a door unlock signal for opening the door of the vehicle, such as with a remote controller, a BCM (Body Control Module) of the vehicle opens the door of the vehicle based on the door unlock signal and simultaneously outputs the door unlock signal to the controller. The controller initializes/boots the telematics terminal based on the door unlock signal, thereby quickly initializing (booting) the telematics terminal. The door unlock signal can also be generated by unlocking the driver's door manually.

By initializing the telematics terminal when the door of the vehicle is opened, the telematics terminal can be quickly initialized. For example, while the driver opens the door of the vehicle, is seated on the driver's seat and turns on the ignition key of the vehicle, the telematics terminal can be initialized, so that the driver can promptly use the telematics terminal.

Also, by initializing the CD/DVD player when the door of the vehicle is opened, the CD/DVD player can be quickly initialized. For example, while the driver opens the door of the vehicle, is seated on the driver's seat and turns on the ignition key of the vehicle, the CD/DVD player can be initialized, so that the driver can promptly use the CD/DVD player.

In addition, by receiving the door unlock signal through the remote controller, which remotely controls the door of the vehicle, and initializing the telematics terminal in the vehicle based on the door unlock signal, the telematics terminal can be more quickly initialized.

It should be understood that the above-described embodiments are not limited by any of the details of the foregoing description. Accordingly, other implementations are within the scope of the following claims.

What is claimed is:

1. A method comprising:
- setting a telematics terminal to a door detection operating mode;
- while the telematics terminal is in the door detection operating mode:
  - receiving an accessory signal at the telematics terminal,
  - disregarding the accessory signal based on the setting of the telematics terminal to the door detection operating mode,
  - receiving a door open signal at the telematics terminal, and
  - initializing the telematics terminal based on the receipt of the door open signal while the telematics terminal is set to the door detection operating mode;
- setting the telematics terminal to an ignition operating mode; and
- while the telematics terminal in the ignition operating mode:
  - receiving a further door open signal at the telematics terminal while the telematics terminal is set to the ignition operating mode,
  - disregarding the further door open signal based on the setting of the telematics terminal to the ignition operating mode,
  - receiving a further accessory signal at the telematics terminal while the telematics terminal is set to the ignition operating mode, and
  - initializing the telematics terminal based on the receipt of the further accessory signal while the telematics terminal is set to the ignition operating mode.

2. The method of claim 1, wherein initializing the telematics terminal based on the receipt of the door open signal comprises initializing a multimedia player within the telematics terminal based on the door open signal.

3. The method of claim 1, wherein the door open signal is a door unlock signal for opening the door of the vehicle.

4. The method of claim 3, further comprising transmitting the door unlock signal with a remote controller.

5. The method of claim 3, wherein the door unlock signal is generated at the door of the vehicle.

6. The method of claim 1, wherein the door open signal is generated responsive to a position or change in position of the vehicle door.

7. The method of claim 1, wherein the door open signal is received as a result of a detection of an opened state of a driver's side door of the vehicle.

8. The method of claim 1, wherein disregarding the accessory signal includes refraining from conducting an initialization.

9. The method of claim 8 wherein refraining from conducting an initialization includes refraining from conducting an initialization which would occur in the absence of receipt of the door open signal.

10. The method of claim 1, wherein initializing the telematics terminal based on the receipt of the door open signal comprises initializing a telematics module within the telematics terminal based on the door open signal.

11. An apparatus comprising:
- a door detecting unit configured to generate a door open signal corresponding to an open state of a door of a vehicle;

a telematics module configured to:

set a door detection operation mode, and set an ignition operating mode; and a controller configured to:

when the telematics module is set to the door detection operating mode:

receive an accessory signal at a telematics module in the vehicle disregard receipt of the accessory signal based on the setting of the telematics module to the door detection operating mode, receive a door open signal at the telematics module, and initialize the telematics module based on the receipt of the door open signal while the telematics module is set to the door detection operating mode, and when the telematics module is set to the ignition operating mode:

receiving a further door open signal at the telematics module, disregard receipt of the further door open signal based on the setting of the telematics module to the ignition operating mode, receive a further accessory signal at the telematics module, and initialize the telematics module based on the receipt of the further accessory signal while the telematics module is set to the ignition operating mode.

12. The apparatus of claim 11, wherein configured to disregard receipt of the accessory signal includes configured to refrain from conducting an initialization which would occur in response to receipt of the door open signal.

13. The apparatus of claim 11, further comprising an interface circuit electrically connected between the door detecting unit and the controller, wherein the interface circuit is configured to receive the accessory signal and the door open signal.

14. The apparatus of claim 11, wherein the door open signal is generated responsive to a position or change in position of the vehicle door.

15. The apparatus of claim 11, wherein the door open signal is a door unlock signal for opening the door of the vehicle.

* * * * *